US010083017B2

(12) United States Patent
Ji et al.

(10) Patent No.: US 10,083,017 B2
(45) Date of Patent: Sep. 25, 2018

(54) PROCESSING SOURCE FILE (71) Applicant: International Business Machines Corporation, Armonk, NY (US)

(72) Inventors: Jin Song Ji, Ponte Verde, FL (US); Yan Liu, Markham (CA); Yi Zeng Mao, Shanghai (CN); Qing Shan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 14/734,796

(22) Filed: Jun. 9, 2015

(65) Prior Publication Data
US 2016/0026443 A1    Jan. 28, 2016

(30) Foreign Application Priority Data
Jul. 23, 2014   (CN) .......................... 2014 1 0353995

(51) Int. Cl.
*G06F 8/41* (2018.01)
(52) U.S. Cl.
CPC ............... *G06F 8/48* (2013.01); *G06F 8/423* (2013.01)
(58) Field of Classification Search
CPC .................................. G06F 8/48; G06F 8/423
See application file for complete search history.

(56) References Cited

U.S. PATENT DOCUMENTS

| 5,680,622 A * | 10/1997 | Even ....................... G06F 8/427 375/240 |
| 5,692,196 A | 11/1997 | Unni et al. |
| 5,854,932 A * | 12/1998 | Mariani .................... G06F 8/71 717/116 |
| 6,078,744 A | 6/2000 | Wolczko et al. |
| 6,704,927 B1 * | 3/2004 | Bak ....................... G06F 9/4431 712/E9.085 |
| 8,621,448 B2 | 12/2013 | Gonion |
| 8,677,314 B1 | 3/2014 | Silverstein et al. |
| 2007/0094650 A1 | 4/2007 | Klein et al. |

(Continued)

FOREIGN PATENT DOCUMENTS

KR    1020090011974 A    2/2009

OTHER PUBLICATIONS

Ji et al., "Processing Source File," English Translation Application and Drawings, Filed on Jul. 23, 2014, p. 1-33, China Patent Application Serial No. 201410353995.X.

(Continued)

*Primary Examiner* — Li B Zhen
*Assistant Examiner* — Amir Soltanzadeh
(74) *Attorney, Agent, or Firm* — Robert C. Bunker (57) ABSTRACT There is provided a method for processing a source file to generate an object file, comprising: obtaining a header file referenced by the source file; in response to the source file calling a data symbol defined in the header file, creating an indicator of a definition the data symbol, wherein definitions of different data symbols correspond to different indicators; and adding the indicator into a compiling result of compiling the source file so as to generate the object file. With the present invention, a dependency between the source file and the header file can be recorded, and the number of source files needed to be re-compiled can be reduced on the basis of the dependency.

14 Claims, 8 Drawing Sheets

(56) References Cited

U.S. PATENT DOCUMENTS

| | | | | |
|---|---|---|---|---|
| 2007/0198972 A1* | 8/2007 | Hogg | ................. | G06F 8/20 |
| | | | | 717/140 |
| 2011/0055814 A1 | 3/2011 | Klarer et al. | | |
| 2013/0104112 A1* | 4/2013 | Novillo | ............. | G06F 8/42 |
| | | | | 717/151 |
| 2013/0167129 A1* | 6/2013 | Emani | ............. | G06F 8/41 |
| | | | | 717/151 |

OTHER PUBLICATIONS

Yu et al., "Reducing Build Time Through Precompilations for Evolving Large Software," Proceedings of the 21st IEEE International Conference on Software Maintenance (ICSM'05), 2005, 10 Pages, IEEE Computer Society.

\* cited by examiner

PROCESSING SOURCE FILE

BACKGROUND

Various embodiments of the present invention relate to the field of compiling, and more specifically, to a method and apparatus for processing a source file to generate an object file.

With the development of computer technology, there have emerged a large amount of programming languages. Moreover, source code in many programming languages involves various types of file formats. For example, regarding the C language, source code may comprise a source file (e.g. *.c file) and a header file (e.g. *.h file); for another example, regarding the C++ language, source code may comprise a source file (e.g. *.cpp file) and a header file (e.g. *.h file and *.hpp file).

Generally speaking, the source file may be used for saving concrete implementation (e.g. body code portion) of a program, while the header file may save an interface (e.g. data structure, definition of a function, etc.) of the program. The source file may reference the header file, for example, via "#include" in C and C++. Specifically, one source file may reference a plurality of header files, while one header file may be referenced by a plurality of source files. Therefore, there may exist complicated multiple-to-multiple reference relationships between source files and header files.

Typically developers will reference a plurality of header files in one source file (sometimes they might reference a header file which the source file actually does not need); at this point, when any one of the plurality of header files is updated (even if the updated header file is totally irrelevant to the source file), the source file needs to be re-compiled.

Note compiling a source file involves a number of processing steps. For example, front-end processing may comprise lexical analysis, syntax analysis, semantic analysis, intermediate code generating, etc., while back-end processing involves code optimizing, object code generating, etc. Therefore, it might take considerable time to compile only one source file.

On the other hand, with the complication of user requirements, a single programmer can hardly complete the development of an application program. Each compiler might develop dozens of and even more source files, and each source file might reference one or more header files. At this point, it might take dozens of minutes and even longer to re-compile all source code. In view of these problems, it demands prompt solution as to how to reduce the time needed to compile source code and increase the compiling efficiency.

SUMMARY

Therefore, it is desired to develop a technical solution capable of reducing the amount of source code needed to be compiled and further reducing the time needed to compile source code; and it is desired to implement the technical solution while not changing an existing compiling solution as far as possible.

In one embodiment of the present invention, there is provided a method for processing a source file to generate an object file, comprising: obtaining a header file referenced by the source file; in response to the source file calling a data symbol defined in the header file, creating an indicator of a definition the data symbol, wherein definitions of different data symbols correspond to different indicators; and adding the indicator into a compiling result of compiling the source file so as to generate the object file.

In one embodiment of the present invention, there is provided a method for processing a source file, comprising: in response to a header file referenced by the source file being updated, looking up in the header file a definition of a data symbol called by the source file; creating a first indicator of the definition of the data symbol; and in response to the first indicator being matched to an indicator in an object file generated from the source file, notifying that the source file does not need to be re-compiled, wherein the object file is generated by a method according to the present invention.

In one embodiment of the present invention, there is provided an apparatus for processing a source file to generate an object file, comprising: an obtaining module configured to obtain a header file referenced by the source file; a creating module configured to, in response to the source file calling a data symbol defined in the header file, create an indicator of a definition the data symbol, wherein definitions of different data symbols correspond to different indicators; and a generating module configured to add the indicator into a compiling result of compiling the source file so as to generate the object file.

In one embodiment of the present invention, there is provided an apparatus for processing a source file, comprising: a lookup module configured to, in response to a header file referenced by the source file being updated, look up in the header file a definition of a data symbol called by the source file; a creating module configured to create a first indicator of the definition of the data symbol; and a notifying module configured to, in response to the first indicator being matched to an indicator in an object file generated from the source file, notify that the source file does not need to be re-compiled, wherein the object file is generated by an apparatus according to the present invention.

By means of the methods and apparatuses of the present invention, an indicator of a definition of a data symbol called by a source file may be recorded in object code generated from the source file. Further, it may be judged on the basis of the indicator whether or not the source file is affected by an updated portion in the header file; if yes, the source file is re-compiled; if not, the source file does not need to be re-compiled. Thereby, the amount of source code to be compiled can be reduced greatly, and further the compiling time can be reduced.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
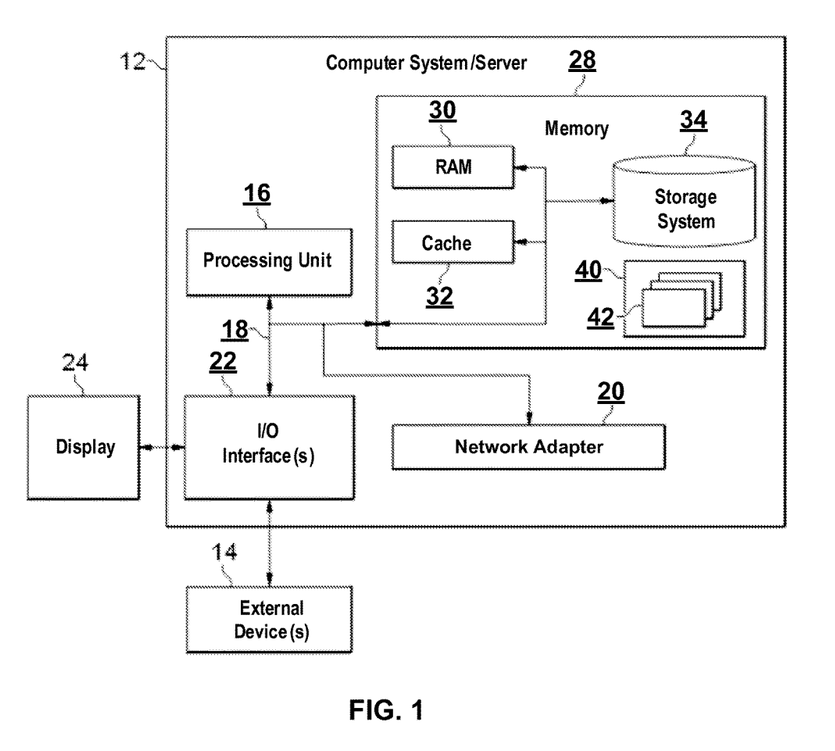
FIG. 1 schematically shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
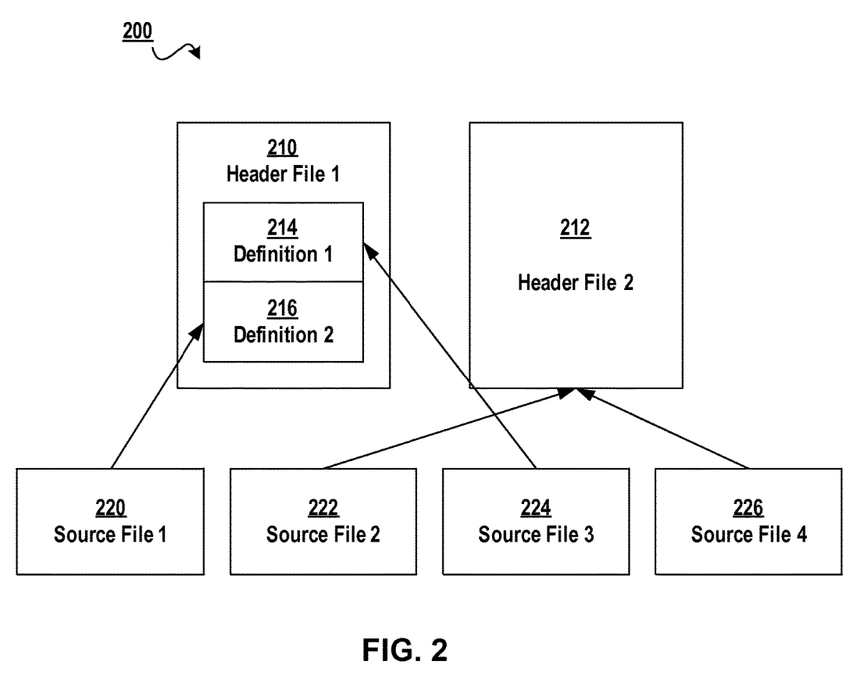
FIG. 2 schematically shows a block diagram of reference relationships between source files and header files according to one embodiment of the present invention.

FIG. 2 schematically shows a block diagram 200 of reference relationships between source files and header files according to one technical solution. As shown in FIG. 2, there may exist complicated reference relationships between source files and header files. For example, a source file 1 220 may reference a header file 1 210, a source file 2 222 may reference a header file 2 212, a source file 3 224 may reference header file 1 210, and a source file 4 226 may reference header file 2 212. Note although FIG. 2 only shows one source file references one header file, those skilled in the art should understand one source file may further reference more than one header file.

In FIG. 2, header file 1 210 comprises two portions, namely a definition 1 214 and a definition 2 216. Although both source file 1 220 and source file 3 224 reference header file 1 210, actually they each calls only partial definitions in header file 1 210. Specifically, source file 1 220 only calls definition 2 216, while source file 3 224 only calls definition 1 214.

According to a current technical solution, since source file 1 220 references header file 1 210, even though only definition 1 214 in header file 1 210 is updated (i.e., the updated portion is irrelevant to source file 1 220), source 1 220 needs to be re-compiled. Where source code references a plurality of header files, the source file needs to be re-compiled if one header file is updated, which will cost considerable time.

In view of the above-described drawback, various embodiments of the present invention propose a method for processing a source file to generate an object file, the method comprising: obtaining a header file referenced by the source file; in response to the source file calling a data symbol defined in the header file, creating an indicator of a definition the data symbol, wherein definitions of different data symbols correspond to different indicators; and adding the indicator into a compiling result of compiling the source file so as to generate the object file.

Figure 3:
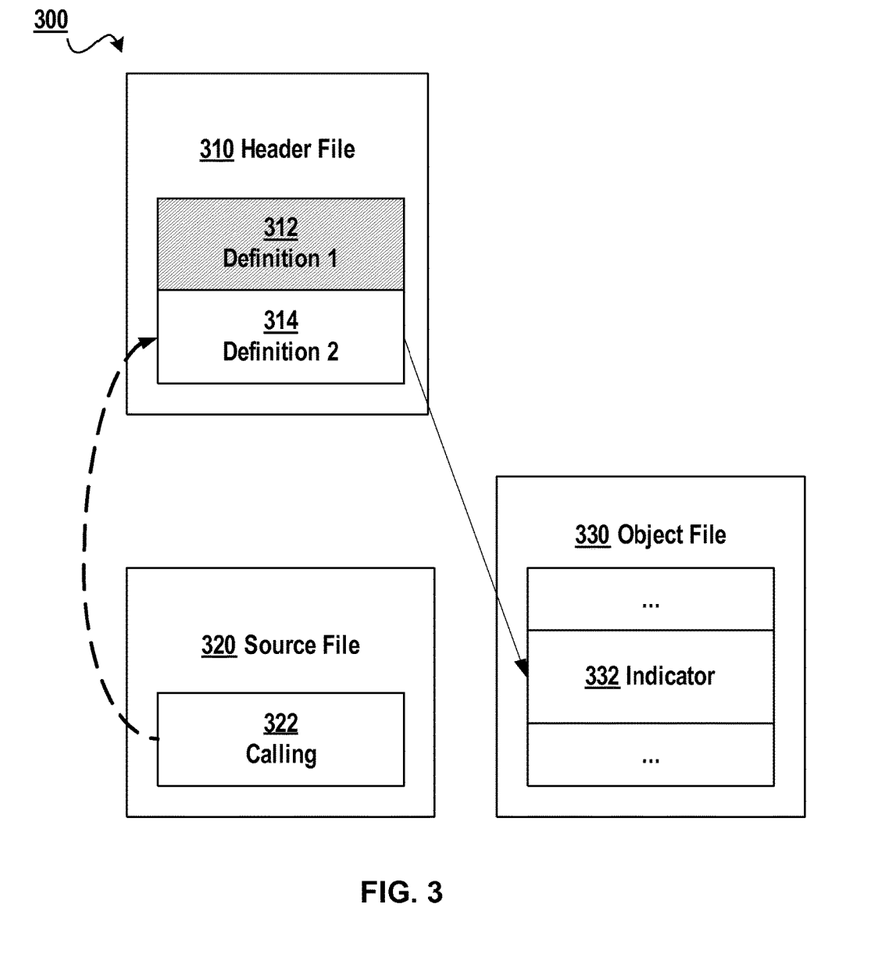
FIG. 3 schematically shows a block diagram of a technical solution for processing a source file according to one embodiment of the present invention.

FIG. 3 schematically shows a block diagram 300 of a technical solution for processing a source file according to one embodiment of the present invention. As shown in FIG. 3, a header file 310 comprises a definition 1 312 and a definition 2 314, a source file 320 comprises calling 322. Header file 310 referenced by source file 320 may be obtained, and an indicator 332 of a definition of a data symbol defined in header file 310 is created on the basis of calling 322 by source file 320 of the data symbol. Indicator 332 indicates that source file 320 is dependent on the definition of the data symbol in header file 310. Subsequently, indicator 322 may be inserted into a compiling result of compiling source file 320 so as to generate an object file 330.

Further, where object file 330 is generated, it may further be judged on the basis of indicator 322 whether the definition of the data symbol in the header file, which is called by the source file, is updated or not. Where the definition of the data symbol in the header file which is called by the source file is updated, the source file is re-compiled; where the definition of the data symbol in the header file which is called by the source file is not updated (no matter whether other portion in the header file is updated or not), the source file does not need to be re-compiled.

Specifically, FIG. 3 shows header file 310 and source file 320, and source file 320 is only associated with definition 2 314 (as shown by a dotted arrow) but is irrelevant to definition 1 312. At this point, if only definition 1 312 is updated (as shown in shadow), source file 320 does not need to be re-compiled; if definition 2 314 is updated (no matter whether definition 1 312 is updated or note), source file 320 needs to be re-compiled. According to the embodiments of the present invention, the amount of source code that needs to be re-compiled can be reduced greatly.

Those skilled in the art should note the term "data symbol" used throughout the context of the present invention may refer to various names defined in source code, for example, may include data (such as various types of variables), functions (program segments for accomplishing given functions) and classes in object-oriented programming languages. Note "struct" in the C language may be construed as a special type of classes, and those skilled in the art may implement corresponding processing with reference to following processing operations with respect to classes, which is not detailed here.

Figure 4A:
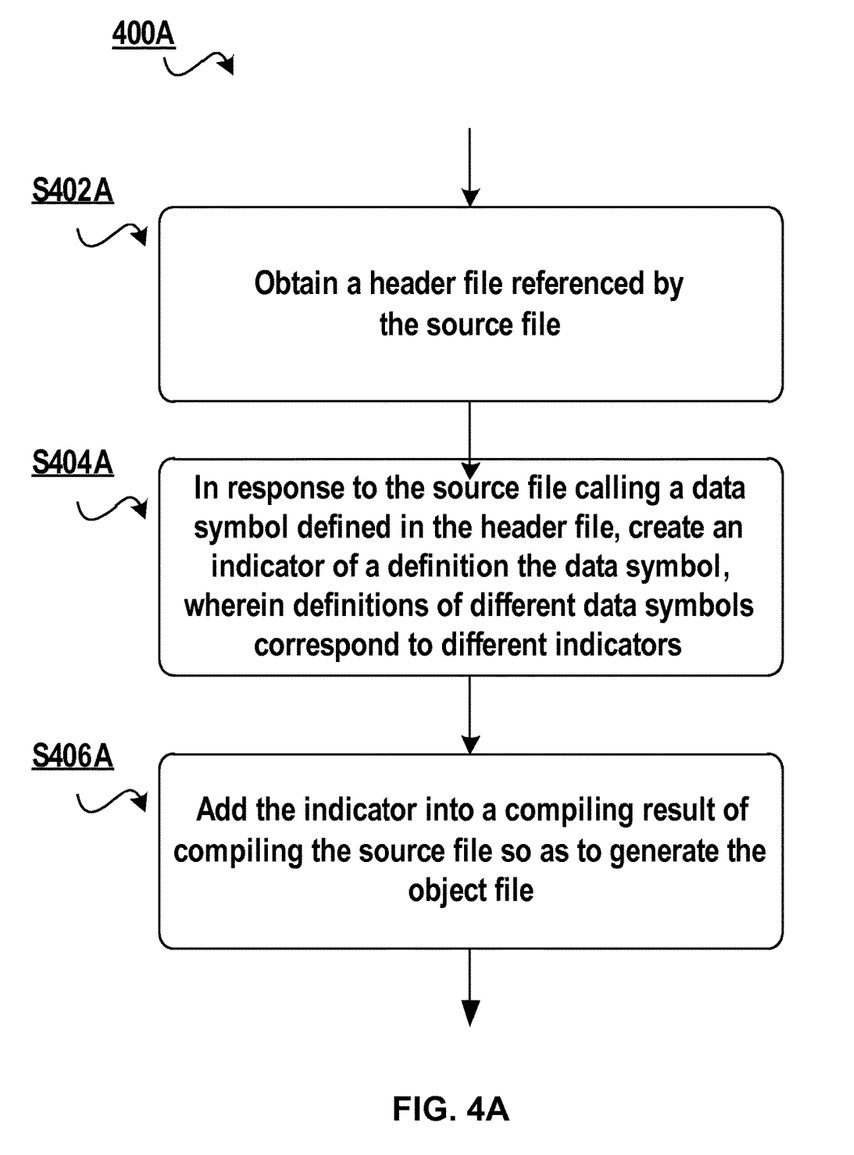
FIG. 4A schematically shows a flowchart of a method for processing a source file to generate an object file according to one embodiment of the present invention, and FIG. 4B schematically shows a flowchart of a method for processing a source file according to one embodiment of the present invention.

FIG. 4A schematically shows a flowchart 400A of a method for processing a source file to generate an object file according to one embodiment of the present invention. Specifically, in step S402A, a header file referenced by the source file is obtained. When the source file references a header file, code in the header file will be copied to a header of the source file, so various data symbols defined in the header file may be called by the source file. In this embodiment the referenced header file should be obtained first, so that dependencies between the source file and a definition of a data symbol in the header file may be analyzed.

Description is presented below to various embodiments of the present invention in the context of source code. For the sake of description, various embodiments will be described by means of the C++ language. Those skilled in the art should understand in the context of the present invention, the C++ language is merely a concrete example where the technical solution as described in the present invention may be applied; the technical solution of the present invention may further be applied to other static programming languages including, without limitation to, C, C++, Object C, C#, Go etc., so long as source code of these static programming languages can be divided into a source file and a header file. For example, the header file and source file may be as shown in Table 1 and Table 2 below, respectively.

TABLE 1

Example of Header File

// test.h
...
int a=1;
inline int add(...){
...}
int add2(...){
}
...

TABLE 2

Example of Source File

// test.cpp
include "test.h"
main( ){
...
int b;
b=a;
...
}

In this embodiment, the referenced file "test.h" may be found through the code line #include "test.h" in the source file "test.cpp." Next, in step S404A, in response to the source file calling a data symbol defined in the header file, an indicator of a definition the data symbol is created, wherein definitions of different data symbols correspond to different indicators. In the example of source file as shown in Table 2, the code line "b=a" calls an integer variable a defined in the header file test.h, so there is a dependency between the source file and the definition of the integer variable a.

In step S406A, the indicator is added into a compiling result of compiling the source file so as to generate the object file. In this step the compiling result results from a compiling step on the basis of the prior art. Those skilled in the art should understand that the object file can be generated by compiling the source file, so by adding the indicator into the compiling result, it is indicated that the source file is dependent on the data symbol represented by the indicator.

Although only one data symbol is called in the source file shown in Table 2 above, in other embodiment, the source file may call a plurality of data symbols defined in a plurality of header files, and those skilled in the art may implement corresponding operations with reference to the above-described principle.

Using the method as described in FIG. 4A, the object file not only saves the compiling result of compiling the source code but also saves the definitions of those data symbols on which the source file depends. In subsequent operations, if the source file needs to be compiled in future, first it may be detected whether the definition of the data symbol called by the source file is updated or not, and then it is judged whether the source file needs to be re-compiled or not.

Figure 5:
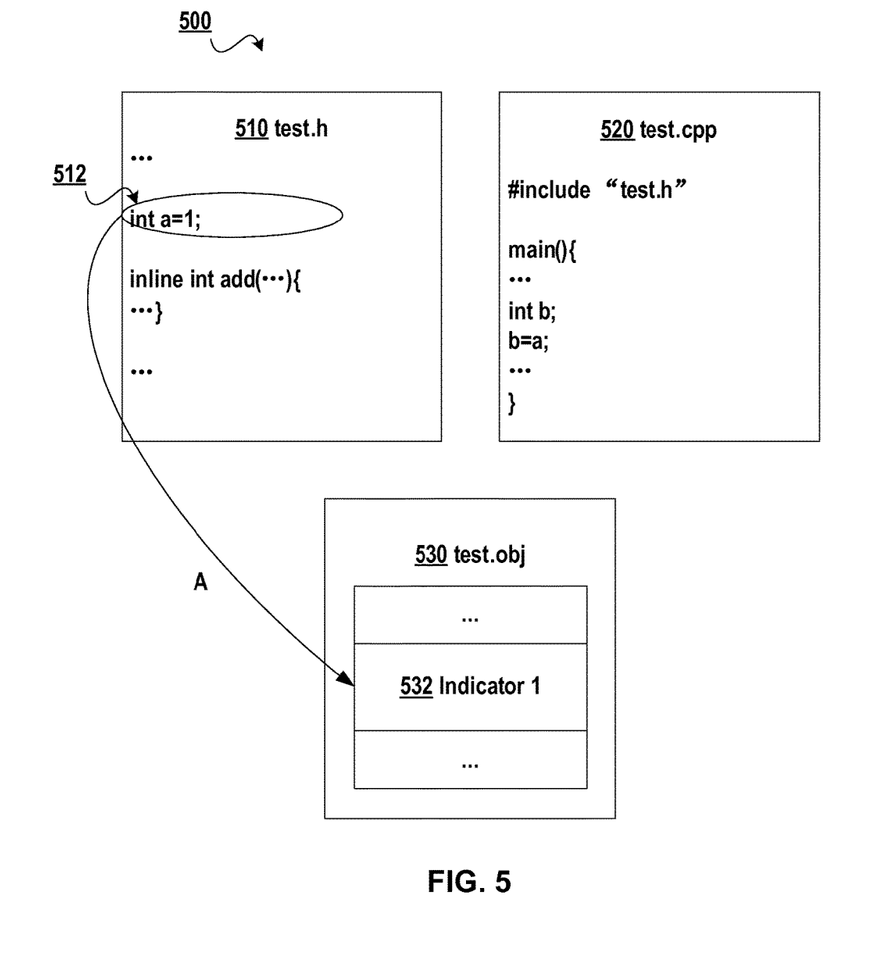
FIG. 5 schematically shows a block diagram of processing a source file to generate an object file according to one embodiment of the present invention.

Now with reference to FIG. 5, detailed description is presented to how to implement the method shown in FIG. 4A. FIG. 5 schematically shows a block diagram 500 of processing a source file to generate an object file according to one embodiment of the present invention. Specifically, FIG. 5 shows respective examples of a header file 510 and a source file 520 written in the C++ language as well as an object file 530 generated using the method shown in FIG. 4A. A code line 512 in header file 510 is a definition of a data symbol 'a' called by source file 520. According to the method shown in FIG. 4A, an indicator 1 532 may be created and inserted into object file 530.

At this point, object file 530 is the object file generated according to the method shown in FIG. 4A above. On the basis that an object file into which an indicator is inserted has been generated, the present invention further proposes a method for processing a source file, comprising: in response to a header file referenced by the source file being updated, looking up in the header file a definition of a data symbol called by the source file; creating a first indicator of the definition of the data symbol; and in response to the first indicator being matched to an indicator in an object file generated from the source file, notifying that the source file does not need to be re-compiled, wherein the object file is generated by a method according to the present invention, and the method of creating the first indicator of the definition of the data symbol is the same as the above-described method of creating the indicator of the definition of the data symbol.

Figure 4B:
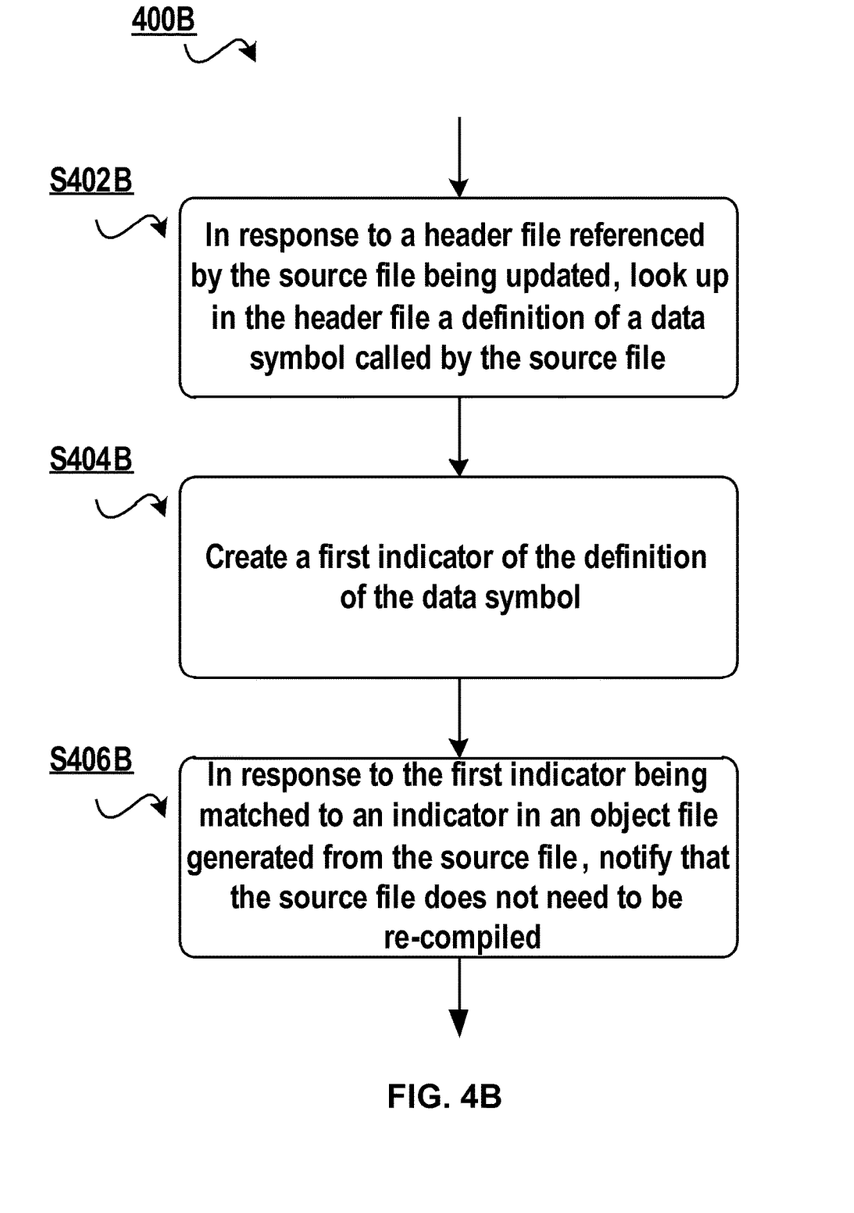

Unlike the existing technical solution, in one embodiment of the present invention, only when an updated portion in the header file has a dependency with the source file (i.e., the updated portion is called by the source file), it is notified to re-compile the source file; otherwise, the source file does not need to be re-compiled. Specifically, FIG. 4B schematically shows a flowchart 400B of a method for processing a source file according to one embodiment of the present invention. First of all, in step S402B, in response to a header file referenced by the source file being updated, a definition of a data symbol called by the source file is looked up in the header file. The present invention is intended to solve how to reduce the amount of source code to be re-compiled when the header file is modified, so the method as shown in FIG. 4B is triggered only when the header file is updated.

In step S404B, an indicator of the definition of the data symbol is created. In this step, a first indicator of the definition of the data symbol is created on the basis of the definition of the data symbol in the updated header file, and the method of creating the indicator is the same as the method of creating an indicator in FIG. 4A.

In step S406B, in response to the first indicator being matched to an indicator in an object file generated from the source file, it is notified that the source file does not need to be re-compiled, wherein the object file is generated according to the method as shown in FIG. 4A. Since the object file generated from the source file already records an indicator generated on the basis of the definition of the data symbol in the object file before updating, by comparing the indicator generated in step S404B with the indicator in the object file in this step, it can be judged whether the definition of the data symbol called in the source file is updated or not.

In one embodiment of the present invention, the method as shown in FIG. 4B further comprises: in response to the first indicator not being matched to any indicator in an object file generated from the source file, notifying to re-compile the source file. In this embodiment, a mismatch indicates the definition of the data symbol called by the source file is already updated, so the source file needs to be re-compiled.

Figure 6:
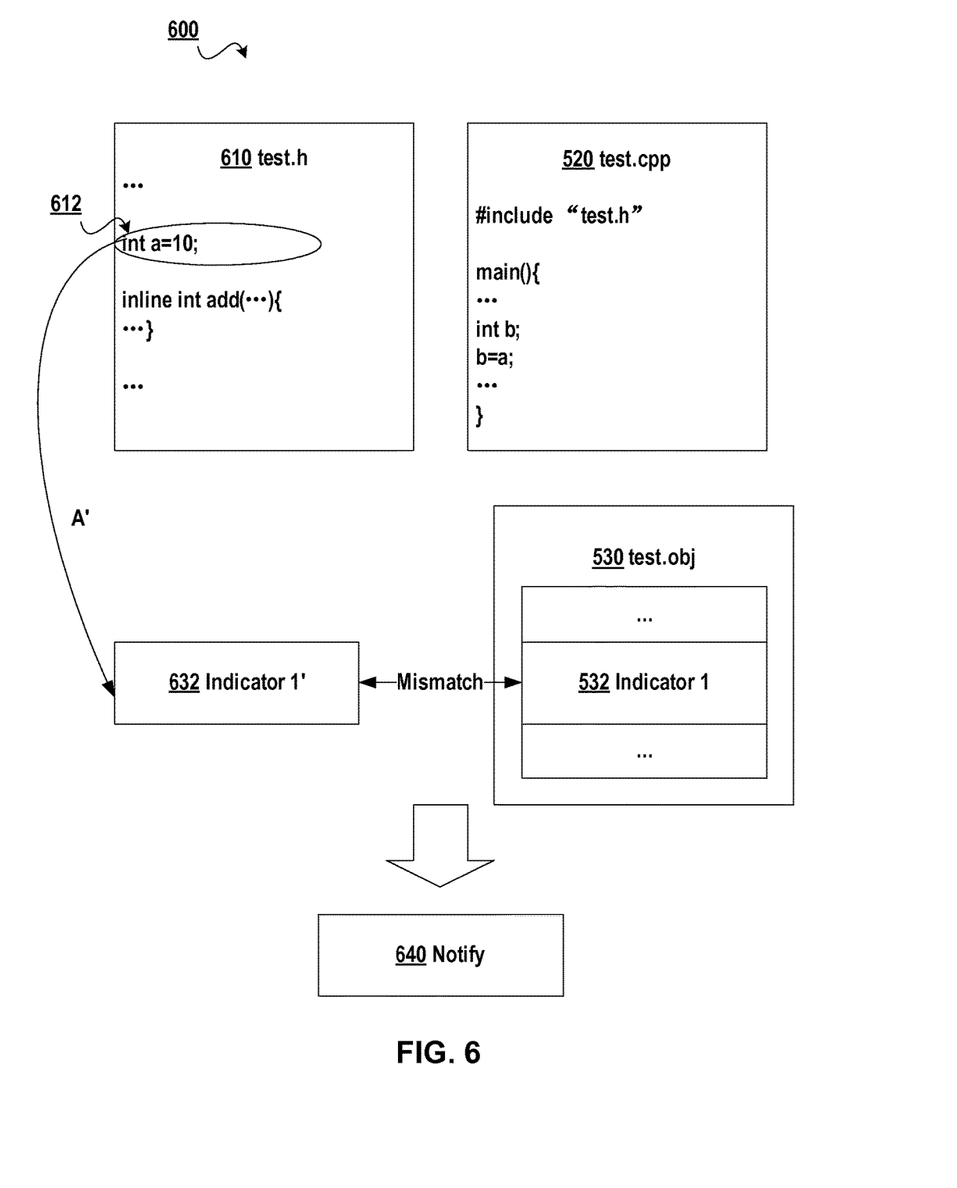
FIG. 6 schematically shows a block diagram of processing a source file according to one embodiment of the present invention.

Now with reference to FIG. 6, description is presented to details of the method in FIG. 4B by means of example. FIG. 6 schematically shows a block diagram 600 of processing a source file according to one embodiment of the present invention, and operations shown in FIG. 6 are further processing of operations shown in FIG. 5. Source file 520 and header file 530 in FIG. 6 are the same as source file 520 and header file 530 shown in FIG. 5, and the difference between FIG. 5 and FIG. 6 is that header file 510 is different from a header file 610. Specifically, code line 512 (int a=1) in header file 510 in FIG. 5 is updated to a code line 612 (int a=10) in header file 610 in FIG. 6. On the basis of the definition "int a=10" of the updated data symbol, an indicator 1' 632 may be generated (as shown by arrow A') according to the method shown by step S404B in FIG. 4B.

Note since object file 530 already stores indicator 1 532 generated on the basis of the definition "int a=1" of the data symbol before updating, indicator 1' 632 may be compared with indicator 1 532 to judge whether they are matched.

Those skilled in the art may understand various methods may be used to generate an indicator of the definition of a data symbol. One of straightforward methods is to use the definition of a data symbol as an indicator. In this manner, indicator 1 532 may be represented as "int a=1," and indicator 1' 632 may be represented as "int a=10." It is found through comparison that indicator 1 532 and indicator 1' 632 are not matched to each other, so a notification 640 may be sent to indicate that source file 520 needs to be re-compiled.

This example only illustrates a simple method of generating an indicator, and those skilled in the art may further use other methods, so long as a generated indicator can uniquely indicate a definition of a data symbol. Hereinafter, other methods for generating an indicator will be described by means of more examples.

In one embodiment of the present invention, the method with reference to FIG. 4B further comprises: in response to the first indicator not being matched to any indicator in an object file generated from the source file, notifying to re-compile the source file; and adding the first indicator into the compiling result so as to generate a new object file.

In this embodiment, since contents of the source file are affected by updating the header file, the source file needs to be re-compiled. Subsequently, the indicator that is generated on the basis of the definition of the data symbol in the updated header file is added into the compiling result, whereby a new object file is generated. The new object file may identify the definition of the data symbol in the updated header file so as to be used as a basis for judging whether the source file needs to be re-compiled when the header file is updated once again.

Detailed description is presented below to more details of the method as shown in FIG. 4A. In one embodiment of the present invention, the creating, in response to the source file calling a data symbol defined in the header file, an indicator of a definition the data symbol comprises: looking up in the header file the definition of the data symbol called by the source file; and creating the indicator on the basis of an identifier of the data symbol and a body of the data symbol.

Continuing the foregoing example, a body of the variable a is "int a=1," which indicates the variable a is an integer variable and its initial value equals 1. For example, the indicator may be represented using a two-tuple (identifier of a data symbol, body of the data symbol). In this embodiment, the indicator may be represented as (a, 1), or a variable's type may be added into the variable's identifier, whereby the indicator is represented as (inta, 1). Those skilled in the art should understand that two-tuples are merely an illustrative embodiment, and those skilled in the art may further use other modes to store the indicator, for example, may use a tuple with other dimension, or compress the indicator to a smaller data size on the basis of a predefined rule.

In one embodiment of the present invention, the creating the indicator on the basis of an identifier of the data symbol and a body of the data symbol comprises: mapping the body of the data symbol to a hash value; and creating the indicator on the basis of the identifier and the hash value.

Note the body of the data symbol might involve a longer character string; when the character string is too long, the length of the indicator created using the above two-tuple method will be great, which increases the data size of the object file. At this point, a hash value of the body of the data symbol may be solved on the basis of a predefined hash algorithm. In the context of the present invention, it is not limited which hash algorithm is used, but those skilled in the art may use any hash algorithm that is currently known or to be developed later, which is not detailed here.

In one embodiment of the present invention, both the identifier and the body of the data symbol may be mapped to corresponding hash values, and then the indicator is created on the basis of the two hash values. Or the identifier and the body are mapped to one hash value, and then the hash value is used as the indicator.

Note a step of solving the hash value may be construed as a step of data compression, which can ensure the indicator will not occupy too much space. Those skilled in the art may define a data structure of the indicator by themselves, for example, may specify the length of the indicator is 128 bits in order to ensure the indicator will not occupy too much space. Or those skilled in the art may further specify other length.

In one embodiment of the present invention, the data symbol may comprise various types, for example, may comprise at least one of data, function and class.

In one embodiment of the present invention, the data symbol is data, and the mapping the body of the data symbol to a hash value comprises: mapping a value of the data to the hash value.

In this embodiment, the data may be a variable or a constant developed by developers. Specifically, various types may be comprised, such as value type (e.g. integer type (int), float type (float), etc.), character (char) type. At this point, a value of the data may be mapped to the hash value. For example, if data "float c=1.234" is defined in the header file, then the data's value "1.234" may be mapped to the hash value.

In one embodiment of the present invention, the data symbol is a function. For example, the header file includes a function "int add2( . . . ){ . . . }" as shown in Table 1 above. When compiling the source file, the function will be inserted into the source file, so the modification to the function's implementation portion (e.g. code portion inside { } in the function add2) will be completely copied to the source file. Thereby, the function's implementation portion does not need to be stored, but only the function's identifier "add2 ( . . . )" portion needs to be stored in the indicator. In this manner, when the function's identifier portion is updated (for example, the function's name is modified or a variable is inputted), whether the function is updated can be found through the indicator in the object file.

Note inline functions are a special type of functions, and all contents of an inline function will be directly copied to a location of a code line calling the function. In one embodiment of the present invention, the data symbol is an inline function, and mapping the body of the data symbol to a hash value comprises: mapping an implementation of the inline function to the hash value.

Since the definition of the inline function will be copied to the location of the code line calling the function, change of code in the body (i.e. implementation of the function) of the inline function will also affect contents of the source file, so the implementation of the inline function needs to be mapped to the hash value. Continuing the foregoing example, when the inline function is "inline int add( . . . ){ . . . }," the function's implementation (i.e. code inside { }) further needs to be mapped to the hash value.

In one embodiment of the present invention, the data symbol is a class, and the mapping the body of the data symbol to a hash value comprises: mapping all member data of the class to a data hash value; mapping all member functions of the class to a function hash value; and creating the hash value on the basis of the data hash value and the function hash value.

Note a class is a complex data structure, and a class may comprise data and a function. An example of classes is shown in Table 3 below.

TABLE 3

Example of Class class TDate
{
    public:
        void SetDate(int y, int m, int d);
        int IsLeapYear( );
        void Print( );
    private:
        int year, month, day;
};

In the definition of a class as shown in Table 3, an identifier of the class is TDate, and code inside { } is a body of the class. The body comprises three member data: int year, month and day; and there are comprised three member functions: void SetDate(int y, int m, int d), int IsLeapYear( ), and void Print( ). At this point, the various data and functions are processed one after another according to the above method. Note since the data and the functions are all members of the class, to uniquely represent a name of each member and data, a prefix "TDate" may be added into each data and function.

Thereby, an indicator of a definition of each type of data symbol can be obtained. Note although how to create an indicator of the definition of a data symbol is illustrated by means of data, function and class throughout the context of the present invention, those skilled in the art may create an indicator for a data symbol of the type that is not described in the present specification, on the basis of the principle of the present invention.

In one embodiment of the present invention, the adding the indicator into a compiling result of compiling the source file so as to generate the object file comprises: inserting, according to a file format definition of the compiling result, the indicator into an extensible field of the compiling result so as to generate the object file.

Note formats of object files defined by different compiler providers are different. Those skilled in the art may look up file format definitions of various provider, the format of each object file has an extensible field, and developers may define usage of the extensible field. In the context of the present invention, the indicator may be inserted into an extensible field supported by the object file format so as to generate the object file as described in the present invention. Regarding the format definition of the object file, those skilled in the art may refer to http://en.wikipedia.org/wiki/Executable_and_Linkable_Format, which will not be detailed throughout the context of the present invention.

Those skilled in the art should understand although how to generate an object file is illustrated in the context of the present invention by means of inserting the indicator into an extensible field of the compiling result, those skilled in the art may further implement the method of the present invention on the basis of other approach. For example, those skilled in the art may design a compiling algorithm and define a file format of a compiling result, so as to insert into the compiling result the indicator that is generated on the basis of the method of the present invention.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 7A:
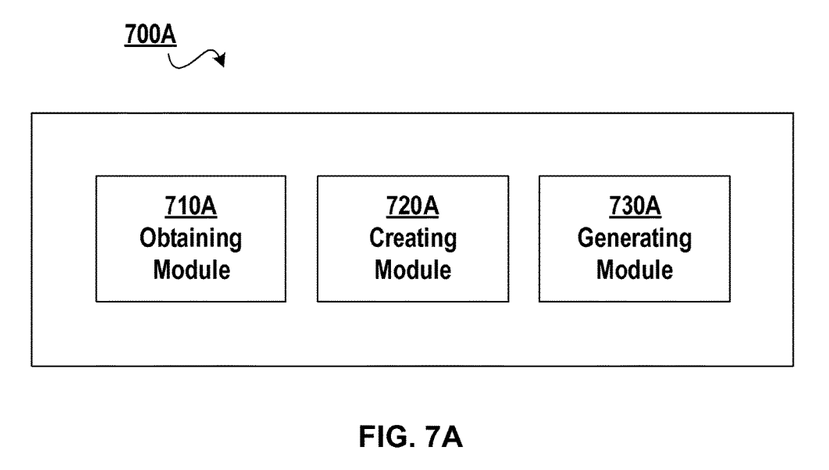
FIG. 7A schematically shows a block diagram of an apparatus for processing a source file to generate an object file according to one embodiment of the present invention, and FIG. 7B schematically shows a block diagram of an apparatus for processing a source file according to one embodiment of the present invention.

FIG. 7A schematically shows a block diagram 700A of an apparatus for processing a source file to generate an object file according to one embodiment of the present invention. Specifically, FIG. 7A provides an apparatus for processing a source file to generate an object file, comprising: an obtaining module 710A configured to obtain a header file referenced by the source file; a creating module 720A configured to, in response to the source file calling a data symbol defined in the header file, create an indicator of a definition the data symbol, wherein definitions of different data symbols correspond to different indicators; and a generating module 730A configured to add the indicator into a compiling result of compiling the source file so as to generate the object file.

In one embodiment of the present invention, creating module 720A comprises: a lookup module configured to look up in the header file the definition of the data symbol called by the source file; and a first creating module configured to create the indicator on the basis of an identifier of the data symbol and a body of the data symbol.

In one embodiment of the present invention, the first creating module comprises: a mapping module configured to map the body of the data symbol to a hash value; and a second creating module configured to create the indicator on the basis of the identifier and the hash value.

In one embodiment of the present invention, the data symbol is data, and the mapping module comprises: a first mapping module configured to map a value of the data to the hash value.

In one embodiment of the present invention, the data symbol is an inline function, and the mapping module comprises: a second mapping module configured to map an implementation of the inline function to the hash value.

In one embodiment of the present invention, the data symbol is a class, and the mapping module comprises: a data mapping module configured to map all member data of the class to a data hash value; a function mapping module configured to map all member functions of the class to a function hash value; and a third mapping module configured to create the hash value on the basis of the data hash value and the function hash value.

In one embodiment of the present invention, the generating module comprises: an inserting module configured to insert, according to a file format definition of the compiling result, the indicator into an extensible field of the compiling result so as to generate the object file.

Figure 7B:
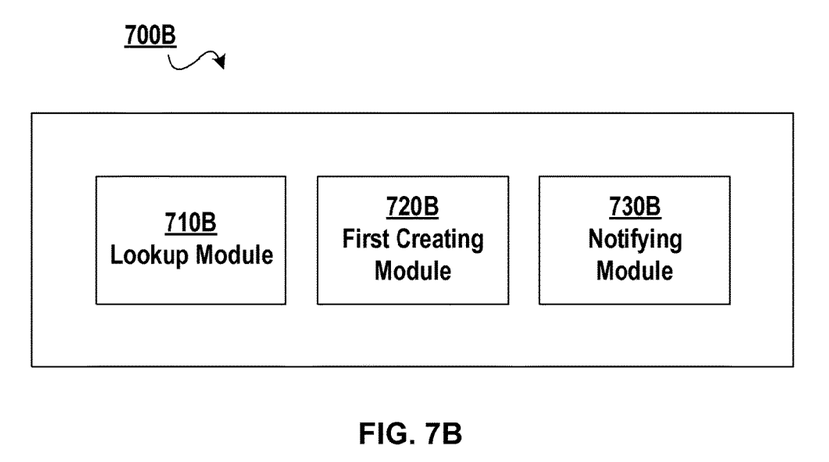

FIG. 7B schematically shows a block diagram 700B of an apparatus for processing a source file according to one embodiment of the present invention. Specifically, FIG. 7B provides an apparatus for processing a source file, comprising: a lookup module 710B configured to, in response to a header file referenced by the source file being updated, look up in the header file a definition of a data symbol called by the source file; a first creating module 720B configured to create a first indicator of the definition of the data symbol; and a notifying module 730B configured to, in response to the first indicator being matched to an indicator in an object file generated from the source file, notify that the source file does not need to be re-compiled, wherein the object file is generated by an apparatus according to the present invention, and the first creating module uses the same creating algorithm as a creating module according to the present invention.

In one embodiment of the present invention, there is further comprised: a second notifying module configured to, in response to the first indicator not being matched to any indicator in an object file generated from the source file, notify to re-compile the source file.

In one embodiment of the present invention, there are further comprised: a compiling module configured to, in response to the first indicator not being matched to any indicator in an object file generated from the source file, notify to re-compile the source file; and a generating module configured to add the first indicator into the compiling result so as to generate a new object file.

Those skilled in the art should understand since the method of the present invention mainly relates to character processing in code within the header file and the source file, the method described by various embodiments of the present invention may be implemented during front-end processing of the compiling procedure. Now that the method of the present invention does not involve any complex computation operation, the method will not cause much additional overheads to the front-end processing.

In addition, the back-end processing during compiling relates to code optimizing and object code generating, and these operations require a large amount of computing resources and time overheads. Generally speaking, time overheads of the back-end processing are far greater than time overheads of the front-end processing (hundreds of times and even higher orders of magnitude), so additional time overheads for implementing the method of the present invention in the front-end processing can be ignored.

Using the methods and apparatuses according to various embodiments of the present invention, by inserting into an object file an indicator of a data symbol called by a source file, it can be explicitly indicated the source file is dependent on which portions in the header file. Further, during subsequent compiling, only when a portion on which the source file is dependent is updated, the source file is re-compiled; otherwise, the source file does not need to be re-compiled. Therefore, the compiling time can be reduced significantly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a source file to generate an object file, comprising:
    obtaining a header file referenced by the source file;
    mapping a body of a data symbol to a first hash value, wherein the data symbol is defined in the header file;
    mapping an identifier of the data symbol to a second hash value;
    in response to the source file calling the data symbol, creating a first indicator using an indicator generator method based on the first hash value and the second hash value, wherein definitions of different data symbols result in creating different indicators that reflect the definition;
    adding the first indicator into an extensible field of a compiling result of compiling the source file so as to generate the object file, wherein the extensible field is based on an object file format associated with the object file;
    in response to the header file referenced by the source file being updated, looking up in the header file a definition of the data symbol called by the source file;
    creating a second indicator using the indicator generator method based on the definition of the data symbol;
    comparing the created first indicator to the created second indicator; and
    in response to the second indicator being matched to the first indicator in an object file generated from the source file, notifying that the source file does not need to be re-compiled.

2. The method according to claim 1, wherein the creating, in response to the source file calling the data symbol defined in the header file, the first indicator using the indicator generator method based on the definition of the data symbol comprises:
    looking up in the header file the definition of the data symbol called by the source file; and
    creating the first indicator on the basis of an identifier of the data symbol and a body of the data symbol.

3. The method according to claim 1, wherein the data symbol is data, and the mapping the body of the data symbol to the hash value comprises mapping a value of the data to the hash value.

4. The method according to claim 1, wherein the data symbol is an inline function, and the mapping the body of the data symbol to the hash value comprises mapping an implementation of the inline function to the hash value.

5. The method according to claim 1, wherein the data symbol is a class, and the mapping the body of the data symbol to the hash value comprises:
    mapping all member data of the class to a data hash value;
    mapping all member functions of the class to a function hash value; and
    creating the hash value on the basis of the data hash value and the function hash value.

6. The method according to claim 1, further comprising:
    in response to the second indicator not being matched to the first indicator in an object file generated from the source file, notifying to re-compile the source file.

7. The method according to claim 1, further comprising:
    in response to the second indicator not being matched to the first indicator in an object file generated from the source file, notifying to re-compile the source file; and
    adding the second indicator into the compiling result so as to generate a new object file.

8. A system for processing a source file to generate an object file, comprising:
    one or more processors, one or more computer-readable memories, one or more computer-readable tangible storage medium, and program instructions stored on at least one of the one or more tangible storage medium for execution by at least one of the one or more processors via at least one of the one or more memories;
    an obtaining module configured to obtain a header file referenced by the source file, wherein a data symbol is defined in the header file;
    a first creating module configured to, in response to the source file calling the data symbol defined in the header file, create the first indicator using an indicator generator method based on a first hash value and a second hash value, wherein definitions of different data symbols result in creating different indicators that reflect the definition, wherein the first creating module comprises:
        a first mapping module configured to map the body of the data symbol to the first hash value and map an identifier of the data symbol to the second hash value;
    a generating module configured to add the first indicator into an extensible field of a compiling result of compiling the source file so as to generate the object file, wherein the extensible field is based on an object file format associated with the object file;
    a lookup module configured to, in response to a header file referenced by the source file being updated, look up in the header file a definition of a data symbol called by the source file;
    a second creating module configured to create a second indicator using the indicator generator method based on the definition of the data symbol; and
    a notifying module configured to, compare the created first indicator to the created second indicator and in response to the second indicator being matched to the first indicator in an object file generated from the source file, notify that the source file does not need to be re-compiled.

9. The system according to claim 8, wherein the first creating module comprises:
    a second mapping module configured to map the body of the data symbol to a hash value, and wherein the second creating module is configured to create the indicator on the basis of the identifier and the hash value.

10. The system according to claim 9, wherein the data symbol is data, and the mapping module comprises the first mapping module configured to map a value of the data to the hash value.

11. The system according to claim 9, wherein the data symbol is an inline function, and the mapping module comprises a second mapping module configured to map an implementation of the inline function to the hash value.

12. The system according to claim 9, wherein the data symbol is a class, and the mapping module comprises:
   a data mapping module configured to map all member data of the class to a data hash value;
   a function mapping module configured to map all member functions of the class to a function hash value; and
   a third mapping module configured to create the hash value on the basis of the data hash value and the function hash value.

13. The system according to claim 8, further comprising:
   a second notifying module configured to, in response to the second indicator not being matched to the first indicator in an object file generated from the source file, notify to re-compile the source file.

14. The system according to claim 8, further comprising:
   a compiling module configured to, in response to the second indicator not being matched to the first indicator in an object file generated from the source file, notify to re-compile the source file; and
   a generating module configured to add the second indicator into the compiling result so as to generate a new object file.

* * * * *